(12) United States Patent
Kirchhoff et al.

(10) Patent No.: US 6,922,251 B1
(45) Date of Patent: Jul. 26, 2005

(54) MEASUREMENT OF THE WEAR OF THE FIREPROOF LINING OF A METALLURGICAL VESSEL

(75) Inventors: Stefan Kirchhoff, Dortmund (DE); Christoff Carlhoff, Willich (DE); Rolf Lamm, Aachen (DE)

(73) Assignee: Specialty Minerals (Michigan) Inc.

( * ) Notice: Subject to any disclaimer, the term of this patent is extended or adjusted under 35 U.S.C. 154(b) by 269 days.

(21) Appl. No.: 10/148,499

(22) PCT Filed: Nov. 28, 2000

(86) PCT No.: PCT/IB00/01762

§ 371 (c)(1),
(2), (4) Date: May 8, 2002

(87) PCT Pub. No.: WO01/38900

PCT Pub. Date: May 31, 2001

(30) Foreign Application Priority Data

Nov. 29, 1999 (DE) .......................... 199 57 375

(51) Int. Cl.[7] ............................................. G01B 11/24
(52) U.S. Cl. ...................................... 356/601; 356/608
(58) Field of Search ................................ 356/601, 608, 356/614, 620, 625–627, 630, 139.03; 250/559.19, 559.21, 559.22, 559.27, 559.29; 266/99

(56) References Cited

U.S. PATENT DOCUMENTS

| 4,025,192 A | | 5/1977 | Scholdstrom et al. |
| 4,264,208 A | * | 4/1981 | Haberl et al. ............... 356/609 |
| 4,315,771 A | * | 2/1982 | Bobillon ....................... 75/458 |
| 4,322,627 A | * | 3/1982 | Pirlet ..................... 250/559.23 |
| 5,125,745 A | | 6/1992 | Neiheisel et al. |
| 5,212,738 A | | 5/1993 | Chande et al. |
| 5,546,176 A | * | 8/1996 | Jokinen ....................... 356/5.1 |
| 5,682,229 A | | 10/1997 | Wangler |

FOREIGN PATENT DOCUMENTS

| DE | 196 14 564 | 1/1996 |
| DE | 198 08 462 | 9/1999 |
| EP | 0 632 291 A2 | 1/1995 |
| EP | 0 661 518 A2 | 7/1995 |
| JP | 02093013 | 4/1990 |
| WO | WO 98/16801 | 4/1998 |

* cited by examiner

Primary Examiner—Gregory J Toatley, Jr.
Assistant Examiner—Roy M. Punnoose
(74) Attorney, Agent, or Firm—Michael J. Herman (57) ABSTRACT

According to the invention, a method for identifying and determining die position of a metallurgical vessel for measuring its fireproof lining using electromagnetic radiation, an operator is defined in relation to a two or three dimensional structure with a known shape and size. Distance values and corresponding measuring angles are determined in the area of the structure and measured distance value and corresponding measuring angles are used to scale the operator. The dimension and resolution of the operator in the pixel coordinates system and the anticipated values of the operator are adapted to the measured polar coordinates. A result value is then formed from the differences between the anticipated values of the operator and the measured values and the location of the structure that is sought is determined from the position of the minimum result value.

22 Claims, 7 Drawing Sheets

MEASUREMENT OF THE WEAR OF THE FIREPROOF LINING OF A METALLURGICAL VESSEL

FIELD OF INVENTION

The invention relates to a method for the identification and determination of the position of an object, in particular a metallurgical vessel while measuring the wear of its refractory lining.

BACKGROUND OF THE INVENTION

To achieve increased effectiveness and improved reliability of the refractory linings of metallurgical vessels in steelworks, it is necessary to obtain as much information as possible about the wear of the linings during use (the so-called "campaign") of the vessels.

In this context, precise knowledge of the thickness of the refractory lining—also called "remaining refractory thickness"—is especially important, since it permits effective utilization of the refractory lining up to the wear limit without an increased risk of blowout of the metallic jacket of the metallurgical vessel.

Consequently, efforts have been underway for quite some time to develop measurement methods that permit precise measurement of the metallurgical vessels. For reasons of time and cost, these methods should not require the vessel to be cooled; instead it should be possible to carry them out in a vessel that is still hot. For this reason, and also due to the inaccessibility of many metallurgical vessels, contacting measurement is inherently out of the question.

A non-contacting measurement method for determining lining wear by the company Ferrotron Elektronik GmbH, of Moers, has thus become known wherein the inner surface of the vessel is scanned by a laser beam and the surface structure of the refractory lining can be imaged by distance and angle measurements. The remaining refractory thickness can be determined by comparison to the reference measurement performed on the metallurgical vessel prior to its campaign.

A prerequisite for wear measurement of the refractory lining of metallurgical vessels by noncontacting methods is determining the position of the object coordinate system of the metallurgical vessel to be measured relative to the device coordinate system of the measurement equipment used for the measurement so that the measurement equipment and the vessel can be brought into the same coordinate system through coordinate transformation.

Known from U.S. Pat. No. 4,025,192, for example, is an optical method for measuring the lining of a metallurgical vessel for the purpose of reconstructing the object coordinate system on which is based a reference measurement of the vessel prior to the campaign with a subsequent wear measurement. In this method, the coordinates of three reference points about the mouth of the metallurgical vessel are, in a first step, determined using a theodolite by means of angle and distance measurements, and the lining is likewise measured by means of angle and distance measurements of individual points.

After the vessel has been used, the reference points and the lining are measured again and the current position of the object coordinate system relative to the position of the device coordinate system is determined by comparing the coordinates of the first reference points measured with the most recently measured coordinates, and a change in position is accounted for in the analysis of the measurement points for the lining. The electromagnetic radiation emitted by the measurement device is manually aimed at the reference points with the aid of a telescopic sight.

Although it has been demonstrated that the position and orientation of the vessel can be determined and also reconstructed before a subsequent wear measurement using this method, the method has the disadvantages that it is cumbersome because it is performed manually, and it has a significant probability of error.

For this reason, and also because automation of the method seemed especially difficult, a process described in DE 196 14 564 A1 was developed wherein a reference mark system on the jacket surface of the vessel is recorded by a camera unit during the reference measurement and before the subsequent wear measurement. The differences between the vessel's position in the reference situation and the measurement situation are deduced from the difference in the position and geometric shape of the reference mark system. While this method does in principle provide automation, it has the disadvantage that the achievable precision of measurement is limited both by the necessarily small size of the reference mark system and the resultant small displacement of individual points of the reference mark system when the vessel's position is changed, and by the merely two-dimensional position determination of the reference points. Moreover, this method requires a separate, advance determination of the position of the vessel relative to the measurement device, which increases the amount of time needed for performing the wear measurement.

DE 198 08 462 A1 discloses a method in which three reference points provided on the metallurgical vessel are first measured by an optical identification unit, but then, after automatic alignment of the measurement equipment with each of the reference points in sequence, the precise positions of the reference points in space are determined by means of the actual measurement equipment, which can include a LASER distance measuring device.

While this method has improved precision of measurement over that of DE 196 14 564 A1 because three-dimensional information is obtained by using the actual measurement equipment to determine the position of the reference points, it nevertheless has the disadvantage of requiring an advance reference measurement using the optical identification unit.

Another method for determining the position of a metallurgical vessel is known from U.S. Pat. No. 5,212,738. Here, the vessel is measured from two different positions, and the position is determined by superposition of the images.

This method has the drawback that the positions must be known precisely relative to one another, which increases the measurement effort.

SUMMARY OF THE INVENTION

The object of the present invention is to create a method with which an object, in particular a metallurgical vessel, can be identified and have its position determined relative to an optical identification unit through recognition of a two- or three-dimensional structure that can comprise the vessel itself or a stationary construction with known geometry which has a defined relationship to the vessel, without the need for multiple measurements from different positions.

This object is attained through the invention described in claim 1.

DETAILED DESCRIPTION OF THE INVENTION

The invention takes advantage of the fact that the spatial measurement data, which are recorded by means of a distance measuring unit that uses electromagnetic radiation, for example a laser distance scanner, are present in polar coordinates and are arranged in a grid with angles φ(m), Θ(n)(Δφ=constant, ΔΘ=constant) relative to the position of the measurement head and the associated distance values Rad(m,n).

A typical dimension of the two-dimensional measurement value matrix m×n thus formed is 450×450.

When reference is made below to a "pixel," an individual point within this matrix is meant. The image produced by the associated distance values Rad(m,n) is referred to as a "distance image".

In addition to the distance Rad(m,n), the intensity value of the reflected laser pulse Amp(m,n) can be detected for each pixel. The so-called amplitude image is produced therefrom in a manner analogous to the distance image.

When measurement values are present in a uniform grid of this nature, the use of matrix operators is known from image processing, where the distance values are processed like the gray levels of a camera image. There is the disadvantage here, however, that when the distance between the measurement device and the measured object is variable, which usually is the case in the wear measurement of a refractory lining of a metallurgical vessel, this method does not take into account the fact that the size of the imaged structures changes with the distance Rad(m,n) and polar angle position (φ, Θ). Accordingly, these conventional operators would have to be scaled a great enough number of times to take into account all measurement situations that arise. This would entail an enormous computational effort and would carry with it the risk of misidentification.

While it is true that, in the method according to the invention, the entire matrix or a section thereof can—as in image processing—be analyzed in discrete steps with respect to specific structures, however, the measured distance values and also the associated polar angles are used for scaling of the operators. This is accomplished in that, during search of the vicinity of an arbitrary pixel (m,n) for a structure of known spatial dimensions, the measured distance value Rad(m,n) and the measuring angles φ(m), Θ(n) are first used to scale the operator. In this process, scaling of the operator means that its extent [imax, jmax] and resolution [Δi, Δj] in the pixel coordinate system i:[−imax, imax, Δi], j: [−jmax, jmax, Δj] and the expected values of the operator R(m+i,n+j) are converted to the measured polar coordinates Rad(m,n), φ(m), Θ(n). The expected values of the operator are calculated from the known two- or three-dimensional spatial structure. The operator thus represents the ideal form of the structure. The image size of the structure is preferably specified in numbers of pixels. The expected value of the operator at point (m,n) can then be calculated via the quadratic deviation between the expected value R and the measured distance Rad in accordance with the following $$S(m, n) = \sum_{i,j} \{R(m+i, n+j) - \text{Rad}(m+i, n+j)\}^2 / \text{norm}(m, n)$$

where norm(m,n) normalizes the result with respect to the number of pixels scanned.

The result matrix S(m,n) can then be evaluated by conventional means with respect to its minimum positions from which the spatial coordinates of the object (or objects) found can then be calculated.

In applying the method in accordance with the invention, it is preferable to follow the steps below:

1. Define the operator in two-dimensional or three-dimensional Cartesian space using the known shape and size of the structure to be found;
2. Repeat the following in a loop:
    i) Scan the matrix Rad(m,n) pixel by pixel;
    ii) Scale the operator using the current scanned coordinates, where
        a) the pixel boundaries are calculated in the rasterized polar coordinate image, and
        b) the expected distances R(m+i,n+j) are calculated for all pixels of the operator in the previously calculated boundaries.
    iii) Calculate the operator at the scanned point P(m,n) using the quadratic deviation between expected distance and measured distance to $$S(m, n) = \sum_{i,j} \{R(m+i, n+j) - \text{Rad}(m+i, n+j)\}^2 / \text{norm}(m, n)$$

3. Choose the desired coordinates Rad(m_opt,n_opt) or Rad(φ_opt, Θ_opt) with the best operator result value by calculating the minimum.

In a first embodiment of the method in accordance with the invention, a sphere is used as the structure. It is especially suitable because the scalable structure of the operator depends on the distances alone, and not on the different angles of observation. The operator is defined by the known radius of the sphere and general sphere geometry. As the result coordinate, it is expedient to calculate the center point M of the sphere through addition of the known sphere radius p. This reference point coordinate is used together with other measured reference point coordinates to determine the position of the vessel in the device coordinate system.

In a second preferred embodiment of the method in accordance with the invention, a light-colored laminar mark that is recessed relative to its surroundings is used as the structure. The operator—hereinafter called "amplitude operator"—is first scaled using measured distance values Rad(m,n), and thus the expected size of the mark is calculated. The mark is then found in the amplitude image through the use of known correlation methods. As a measurement mark, a light, cruciform mark could be placed on the converter bottom. Once a pixel position with optimal agreement has been determined, its spatial coordinates can be calculated in the device system, taking into account the associated distance value Rad(m,n).

In a third embodiment of the method in accordance with the invention, the vessel itself serves as the structure. This selection of structure is especially suitable for measurement of vessels having a fundamentally cylindrical structure. The operator—hereinafter called "V operator"—first finds a point on the vessel mouth, and from there calculates at least two additional points on the mouth of the vessel, where at least one point in the vessel interior is found as a control. In this embodiment of the method, the position and orientation of the vessel can be roughly determined even in a tilted state. This is necessary for subsequent calculations, for example precise calculation of the vessel's position preferably using the embodiment of the inventive method described below.

The subsequent embodiment of the method in accordance with the invention, which serves to calculate the precise position of the vessel, uses the vessel mouth as the structure. Using the rough positions found in the preceding step, the distance and angle values of points on the vessel mouth are examined in search windows which run radial to the identified vessel center. From this can then be extracted a vector Rad(K), on which a search is made for a segment with the predetermined length b that corresponds to the thickness of the mouth ring (in Cartesian coordinates) by means of a scaled operator—hereinafter called "mouth operator." The angle of inclination γ of the segment to be found is determined from the tilted position of the vessel measured by the V operator.

If, as is preferred, this embodiment of the method is applied to a plurality of search windows which cover the entire measured mouth region, one obtains a number of mouth points from which the position of the circular mouth that is to be found can be calculated through a circular approximation.

It can happen that the mouth becomes sufficiently contaminated during the campaign of the metallurgical vessel that a point on the vessel mouth cannot be identified with certainty by the V operator, and thus the tilted position of the vessel cannot be determined.

In this case, an embodiment of the method in accordance with the invention is preferred wherein other cylindrical structures of the vessel are used to determine its position, for example a ring or collar surrounding the outside of the vessel. In this case the tilt angle is determined with the aid of an inclinometer.

In another preferred embodiment of the method in accordance with the invention, the transition region between the wall and bottom of the vessel is used as the structure, and the operator—hereinafter called "wall-bottom operator"—is defined by two segments of length $\Delta x$, $\Delta z$, which have a predetermined angle δ to one another and whose ends coincide at one point. As in the embodiment of the inventive method described above, the course of the vessel profile in the transition region from wall to bottom is schematized, and this structure is scaled and localized within a search window that extends radially to the roughly determined vessel center. The position of the circular wall-bottom transition is then obtained from a suitably large number of such search operations.

The method in accordance with the invention can in particular be used to determine the position of a converter, ladle or electric arc furnace relative to the measurement device.

The inventive method for the first time permits application for electric arc furnaces, which usually comprise a pot-shaped, upright furnace body whose interior is only accessible from above, when the furnace is still hot, since the measurement time is always shorter than 20 seconds and the measurement device can be equipped without unacceptably great expense such that it can withstand the heat to which it is exposed for this period of time during the measurement process.

An apparatus that is especially suitable for carrying out the inventive method comprises a transmitting device to emit pulsed electromagnetic radiation;

a receiving device to receive the electromagnetic radiation reflected by an object;

a time measurement device to measure the transit time of a pulse of electromagnetic radiation between emission and reception after reflection from the object;

a deflector device for predetermined, periodic deflection of the pulsed electromagnetic radiation in two mutually perpendicular directions;

a data acquisition and processing device for acquiring the angles in two mutually perpendicular directions at which the electromagnetic radiation has been emitted, and the transit time, and also for storing previously known or determined spatial structures and for comparing spatial structures measured through acquisition of the angles and the transit time with the previously known or determined structures in order to determine the present position of the measured structures.

If the apparatus additionally has a means for acquiring the amplitude of the electromagnetic radiation reflected by the object, it can be used to make an amplitude image, which in practice is similar to a black-and-white photograph. In particular, the amplitude image can be used to determine whether the object (metallurgical vessel) fills the image segment, and the results obtained with the inventive method can be checked optically.

If a device is additionally provided to measure the thermal radiation emitted approximately at the location reflecting the electromagnetic radiation, then heat distribution images can be produced that can provide information on areas of the vessel that are especially strongly temperature stressed, for example.

The transmitting device preferably comprises a LASER diode operated in pulsed mode, and the receiving device takes the form of a photodiode.

To carry out the measurement—as already mentioned—a grid of measured values is recorded. The periodic deflection of the LASER that is required for this purpose is accomplished in the vertical direction by means of a polygonal mirror rotating about a horizontal axis, and in the horizontal direction through reciprocating motion of the measurement device about a vertical axis.

The apparatus is particularly suited for determining the position of an electric arc furnace and subsequent measurement of its refractory lining when it is mounted on a bracket that can move back and forth between a position that is removed from the metallurgical vessel and a position above or within the open vessel.

In this case it is also possible, and of inventive importance for its own sake, to provide on the bracket, in a fixed spatial relationship to the measurement device, a device for the application of refractory material to the interior of the vessel.

This device for the application of refractory material can be, in particular, a known spray robot made by MINTEQ International Inc. under the name of MINISCAN™ that can be introduced with its spray nozzle into the interior of the vessel such that it is capable of rotation, tilting and height adjustment.

This spray robot can be controlled directly with the wear data measured with the apparatus.

By means of a further measurement of the interior of the vessel in the described manner, a maladjustment of the spray robot can be detected in that the faulty application becomes visible.

If the measurement device and the spray nozzle are located in a fixed spatial relationship to one another on the bracket, the actual position of the spray nozzle in the vessel can be determined, and hence faulty applications prevented, with the aid of the inventive method.

The inventive method and a device that is suitable for carrying out the method are explained on the basis of the figures. They show.

Figure 1:
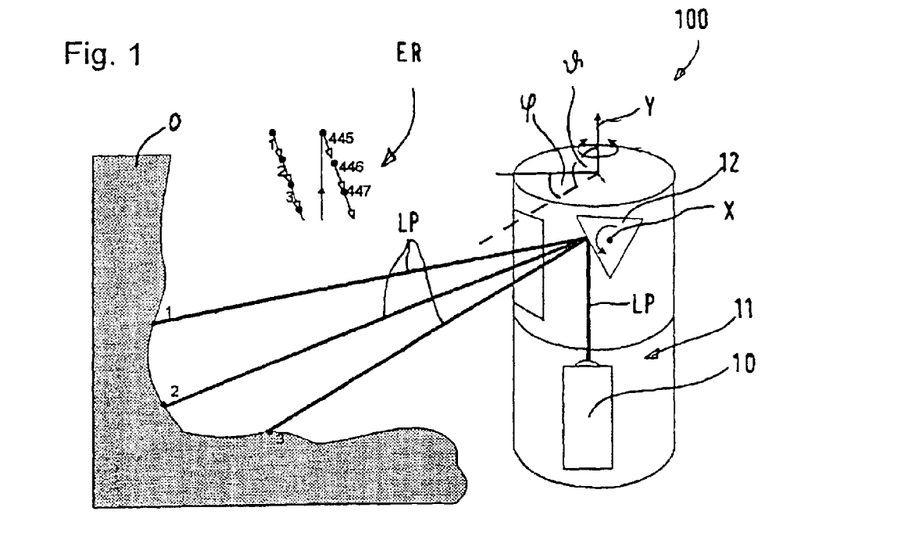
FIG. 1—schematically—an apparatus suitable for carrying out the inventive method.

In carrying out the inventive method, a measurement device, labeled 100 as a whole in FIG. 1, can be used. The measurement device 100 comprises a transmitter 10 for generating LASER pulses LP, devices for deflecting the LASER pulses in desired spatial directions, and a receiver 11 for detecting laser pulses reflected from an object O. Transmitter 10 and receiver 11 are connected to an electronic time measurement device that measures the time between the emission of a LASER pulse by the transmitter 10 and the reception by the receiver 11 of the LASER pulse LP reflected from the object O, and calculates the distance of the reflecting object O from the measurement device 10 based on the speed of light and stores the distance in association with the relevant spatial direction.

A LASER diode can serve as the transmitter 10 and a photodiode as the receiver 11. The devices for deflecting the LASER pulses can be a polygonal mirror 12 rotating about an axis X (axis $Y_1$ in FIG. 3a) perpendicular to its parallel faces, whose faces that intersect at acute angles reflect the LASER pulses, and a device for pivoting the measurement device 10 about an axis Y (axis $Z_1$ in FIG. 3a) that is perpendicular to the axis X. In the example embodiment shown, the rotational speed of the polygonal mirror 12 is 10 rotations per second, and the pivoting of the measurement device takes place at 2° per second. The LASER diode emits 20000 pulses per second.

In the apparatus shown in FIG. 1, rotation of the polygonal mirror 12 causes rapid deflection of the LASER pulses in the vertical direction (in FIG. 1, the directions of travel of three successive LASER pulses which strike the object O at the locations 1, 2, 3 are shown schematically), whereas the deflection of the LASER pulses in the horizontal direction is accomplished by reciprocating motion of the entire measurement device about the axis Y. Since the laser distance measuring device generates the measured quantities at constant time intervals, and the rotational movements are uniform as well, scanning of the object surface takes place in regular angular steps. Vertical motion is always from top to bottom, while horizontal motion alternates between clockwise and counterclockwise. The measurement device 100 thus records a distance grid that in principle has the structure shown in the representation ER in FIG. 1. This distance grid typically comprises approximately 400×400 measurement points (pixels).

The receiver 11 can additionally have a device for detecting the thermal radiation WS emitted by the point of the particular object whose distance is currently being measured.

Figure 2:
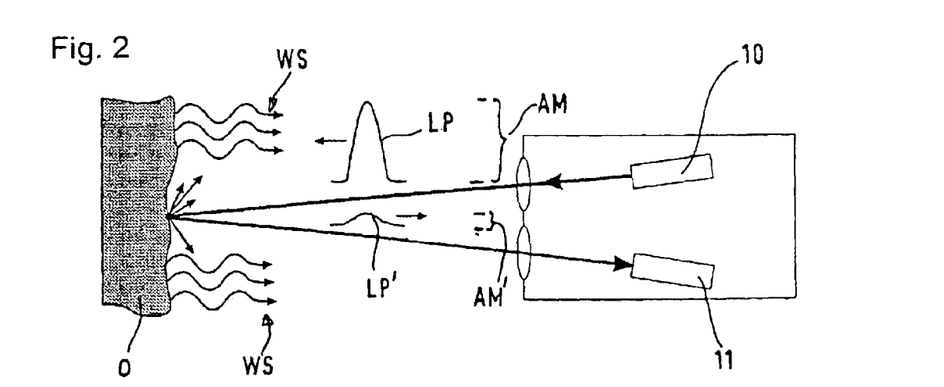
FIG. 2—schematically—the principle of the pulse transit time measurement that is preferably used for distance determination.

As can be seen in FIG. 2, the amplitude AM' of the LASER pulse LP' reflected from the object O is a function of the amplitude AM of the emitted LASER pulse LP and the surface structure at the reflecting point, for example the roughness.

Consequently, the following measured values are determined for each measurement point with the measurement device 100:

distance Rad between the measurement device and the reflecting point of the object amplitude of the reflected LASER pulse LP' thermal radiation WS at the reflecting point of the object horizontal and vertical angles at which the LASER pulse LP is emitted by the measurement device.

If one considers the horizontal and vertical angles $\phi$, $\Theta$ as coordinate axes and represents the measured amplitude value AM' as a gray level on the relevant angle coordinate, the result is the amplitude image, which is very similar to a black-and-white photograph. In the same way, the measured distance and thermal radiation values can be represented as images, although they can be coded using a color scale.

The amplitude image is of great importance for the individual operating the measurement device:

a) verification of whether the vessel fills the image segment properly;

b) interactive scan analysis or monitoring of the automatic scan analysis by means of superimposed structure elements (circles, etc.).

The distance image constitutes the basis for calculation of the measured results. Because of their regular, gridded arrangement, the distance image data can be used for automatic finding of structures (e.g. mouth, carrier ring (trunnion), wall-bottom interface, spheres, etc.).

If one converts the measured values from the thermal radiation image into measured temperature values by means of a calibration device and then places these values in the object coordinate system, information with metallurgical significance regarding the thermal condition (for example, temperature distribution, heat content of the refractory lining) can be determined, especially in conjunction with the remaining refractory thickness which also has been measured.

To be able to perform a wear measurement of, for example, the refractory lining of a metallurgical vessel, through the use of the measurement device 100 in a manner that is known per se, it is necessary to first determine the relative positions of the measurement device and the vessel.

Figure 3A:
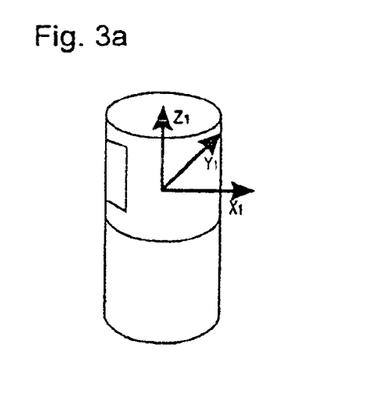
FIGS. 3a–c the coordinate system that is of primary importance in measuring the position of an object using the inventive method with the example of a cylindrical vessel.

For each spatial measurement, a reference point and the direction to which the measured value relates must be specified in addition to the dimensional unit. A point in space can be described by three measured values (coordinates), which all relate to a common reference point (origin) and each relate to mutually perpendicular directions (coordinate axes). In connection with the inventive method, a distinction is drawn between the following coordinate systems, which are represented in FIGS. 3a–3c using the example of a metallurgical vessel:

1) device system $X_1$, $Y_1$, $Z_1$: origin and axes determined through measurement head geometry (FIG. 3a)

Figure 3B:
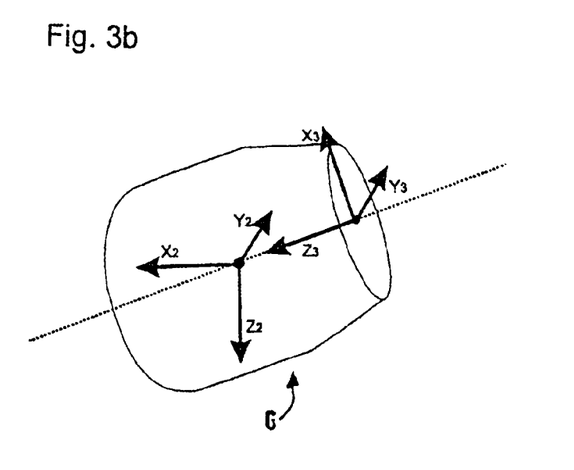
Figure 3C:
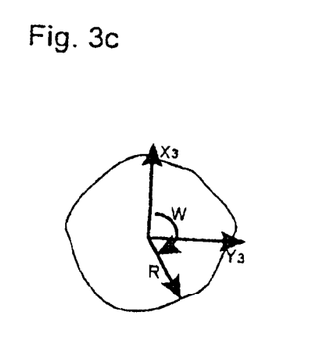

2) rotational axis system $X_2, Y_2, Z_2$: origin=the center of the converter on the rotational axis, Z axis ($Z_2$) in the direction of a 180° angle of rotation, Y axis ($Y_2$) rotational axis (FIG. 3b)

3) object system $X_3, Y_3, Z_3$: origin=center point of the mouth ring 3, Z axis ($Z_3$) perpendicular to mouth ring 3, X axis ($X_3$) perpendicular to rotational axis ($Y_2$) (FIG. 3b). A point in the object system can also be represented in cylindrical coordinates W, R, Z3 (cf. FIG. 3c).

After a measurement scan has been recorded, approximately 200,000 measurement points are present in polar coordinates $\phi$, $\Theta$, Rad referenced to the device system $X_1, Y_1, Z_1$. In this form, it is not yet possible to draw conclusions from them relative to the surface structure of the object O, here the refractory material $X_3, Y_3, Z_3$. To do this, the measurement points must be expressed with reference to the object system (coordinate transformation). Because the measurement device will regularly be in a different position relative to the object in every scan, the position of the object system $X_3, Y_3, Z_3$ relative to the device system $X_1, Y_1, Z_1$ also must be determined anew each time. This analysis produces as its result the found position of the object, which is expressed mathematically in the form of a transformation matrix.

Preferred example embodiments of the inventive method for determining the position of a vessel are explained below with reference to FIGS. 4 to 12, using a cylindrical vessel G as an example.

Figure 4A:
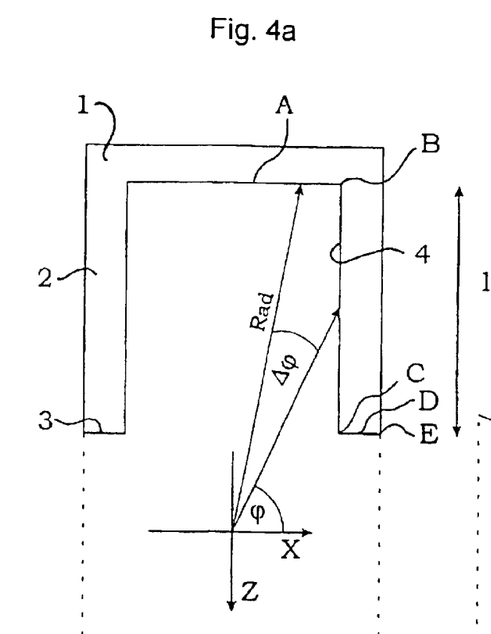
FIG. 4a a longitudinal section through a cylindrical vessel closed at one end in Cartesian coordinates.
Figure 4B:
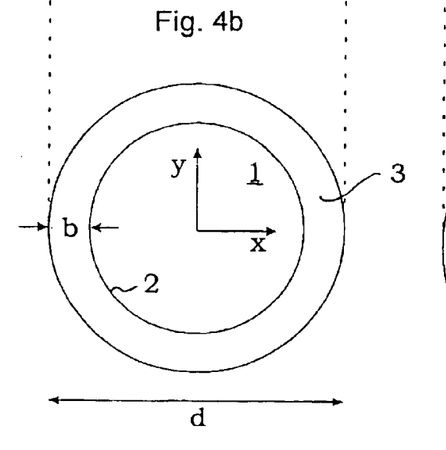
FIG. 4b a view of the mouth end of the same vessel (view A in FIG. 1a), likewise in Cartesian coordinates.

The cylindrical vessel G shown in FIGS. 4a and 4b has a bottom 1, a cylindrical wall 2 and a mouth 3. The outer diameter of the mouth ring, which in the illustrated example embodiment corresponds to the outer diameter of the wall 2, is d, and the thickness of the mouth ring is b.

Figure 5A:
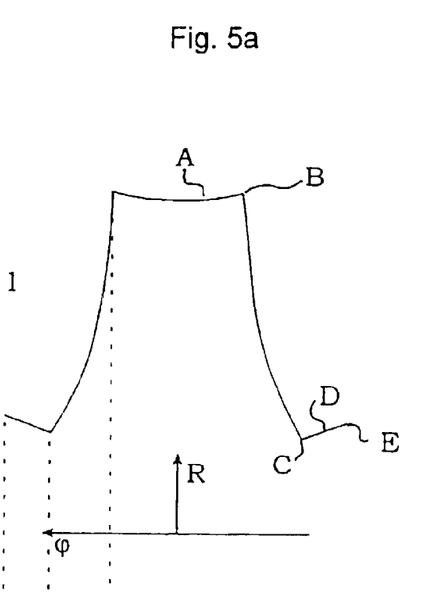
FIG. 5a a view of the same vessel corresponding to FIG. 1a in polar coordinates.
Figure 5B:
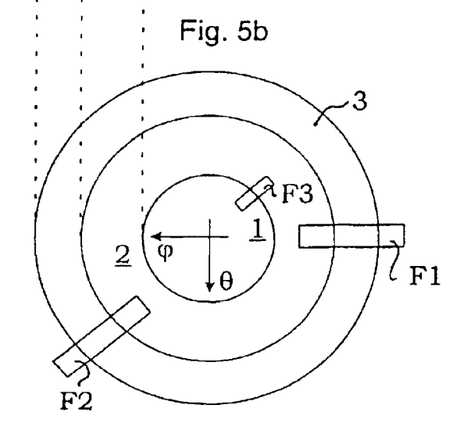
FIG. 5b a view of the same vessel corresponding to FIG. 1b in polar coordinates.

For the purpose of explanation, in FIG. 4a and FIG. 5b, which show the same vessel in the same view as in FIG. 4a but in polar coordinates, a point within the vessel is labeled A, a point where the bottom and interior wall 4 intersect is B, a point located on the interior boundary line of the mouth 3 is C, a point located approximately in the center of the wall forming the mouth area is D, and a point on the circle forming the outer edge of the mouth is E.

Figure 6A:
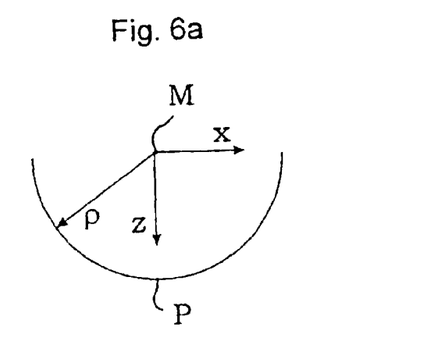
FIGS. 6a and b—schematically—the coordinates of the sphere operator in two mutually perpendicular views.
Figure 6B:
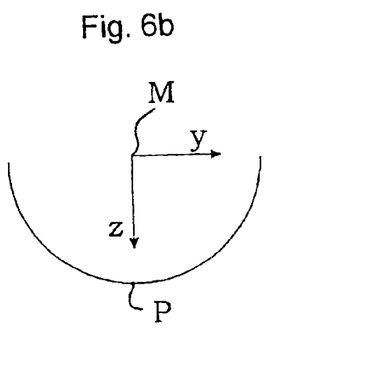

As FIGS. 6a and 6b are intended to make clear, the sphere operator extends in the three mutually perpendicular spatial directions in Cartesian coordinates such that the origin of the pertinent Cartesian coordinate system coincides with the center point M of the sphere.

Figure 7A:
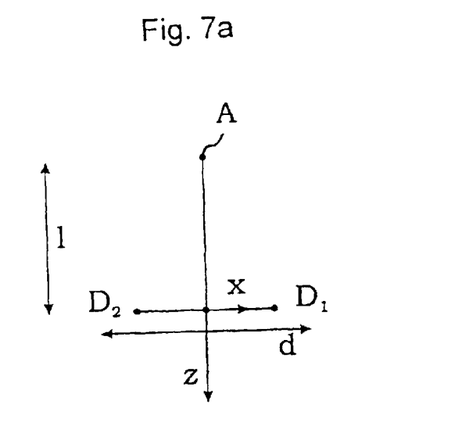
FIGS. 7a and b—schematically—the coordinates of the so-called V operator in mutually perpendicular representations.
Figure 7B:
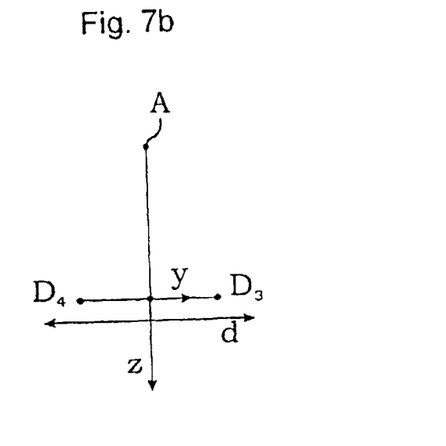

In contrast, the three-dimensional V operator extends between points D1, D2, D3, D4 located approximately in the center between the inner and outer mouth boundary, and a point A within the vessel.

Figure 8:
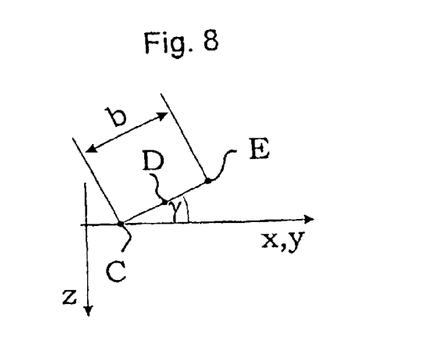
FIG. 8—schematically—the coordinates of the two-dimensional mouth operator.

As can be seen in FIG. 8, the mouth operator is defined in two-dimensional Cartesian space about a point D approximately in the center between the inner and outer mouth boundaries and the points C and E, which are located on the inner and outer mouth boundaries.

Figure 9:
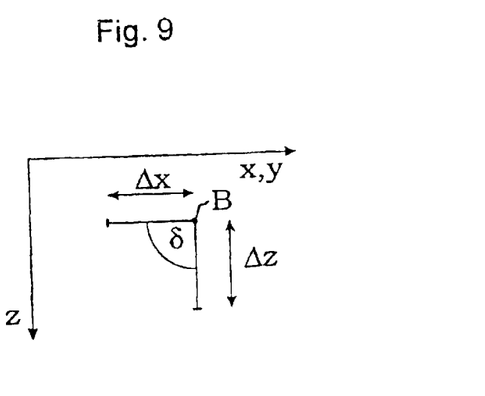
FIG. 9—schematically—the coordinates of the two-dimensional "wall-bottom operator"

The wall-bottom operator, which likewise is two-dimensional, is defined by two segments of lengths $\Delta x$, $\Delta z$, whose ends coincide at one point and which, in the example embodiment shown, have a predetermined angle $\delta$ of 90° to one another. The curve of the vessel profile in the region of transition between the wall and the bottom is diagrammed by this means.

Figure 10A:
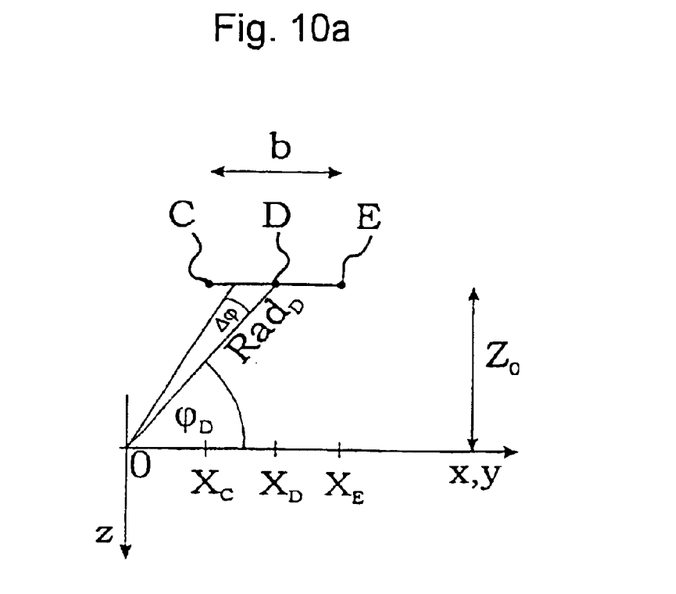
FIGS. 10a and b a measurement process in Cartesian coordinates and gridded polar coordinates using the example of the mouth operator to illustrate the example calculation below.
Figure 10B:
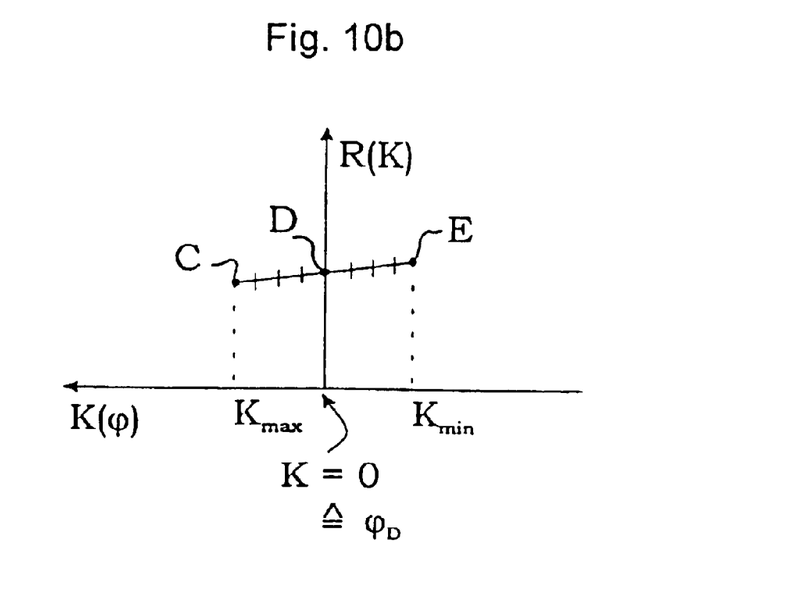

Now we shall explain the inventive method using the example of the mouth operator with the coordinate $\gamma=0$ in window F1 from FIG. 5b with reference to FIGS. 10a and 10b.

The mouth operator extends between the points C, D and E, which delimit the wall of the mouth or are located approximately in the center of the wall (see also FIG. 8). As is also visible in FIG. 10a, the following applies to the distance $Z_0$ for the scan point D:

(1) $Z_0 = \text{Rad}_{D \cdot \sin \phi D}$, where $\text{Rad}_D$ and $\phi_D$ are measured values of the scanned pixel n.

If one further considers that—as is likewise clear from FIG. 10a—

(2) $X_D = \text{Rad}_D \cdot \cos \phi_D$ applies, then the boundaries of the mouth operator are calculated using:

$X_C = X_D - b/2 \rightarrow \phi_C = \text{atan}(Z_0/X_C) \rightarrow K\text{max} = \text{round}\ [(\phi_C - \phi_D)/\Delta\phi]$ $X_E = X_D + b/2 \rightarrow \phi_E = \text{atan}(Z_0/X_E) \rightarrow K\text{min} = \text{round}\ [(\phi_E - \phi_D)/\Delta\phi]$ The target distances R(K) are then calculated using:

(3) $K=0: R_{(K=0)} := \text{Rad}_D$ $K=1: R_{(K=1)} = Z_0/\sin(\phi_D + \Delta\phi)$ in general: $R_{(K)} = Z_0/\sin(\phi_D + K \cdot \Delta\phi) =$ $$\text{Rad}_D \frac{\sin\varphi_D}{\sin(\varphi_D + K \cdot \Delta\varphi)} \text{ for } K\varepsilon[K_{\min}, K_{\max}]$$

Then for the result value at the scan position m, the following applies:

$$S(m) = \sum_{K=K_{\min}}^{K_{\max}} \{\text{Rad}(m+k) - R_{(K)}\}^2 / (1 + K_{\max} - K_{\min})) \quad (4)$$

Figure 11A:
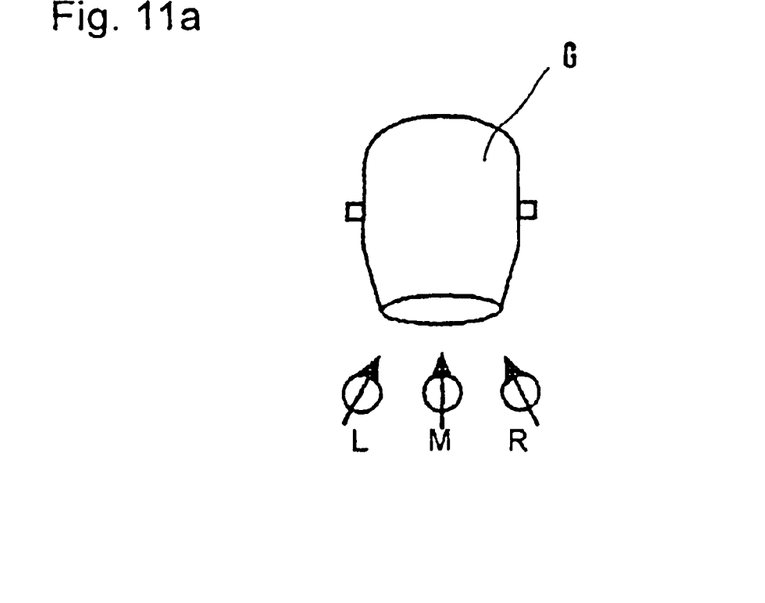
FIG. 11a—schematically—various measurement positions of the measurement device with respect to the object in the rotational axis system.
Figure 11B:
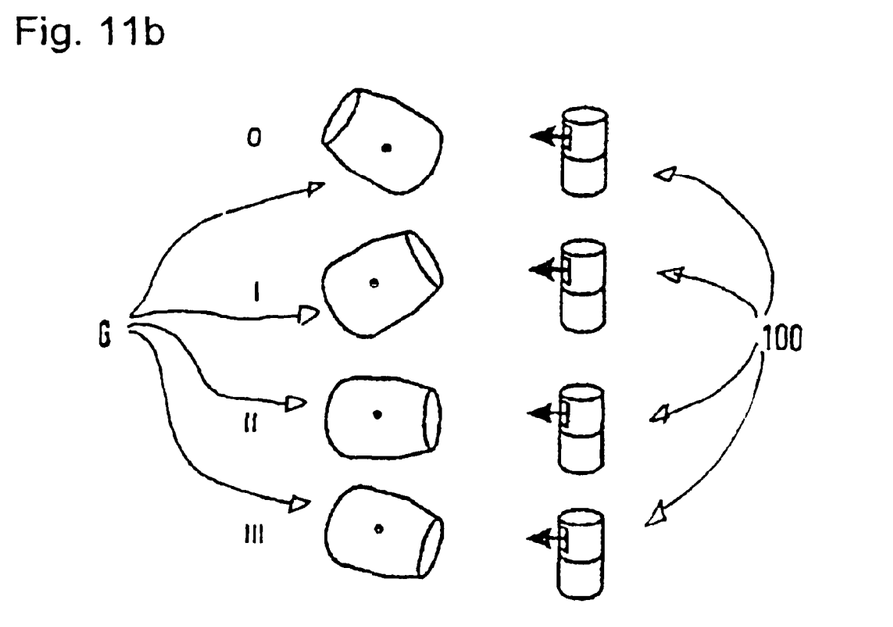
FIG. 11b—schematically—various tilt positions of the object in the rotational axis system.
Figure 12:
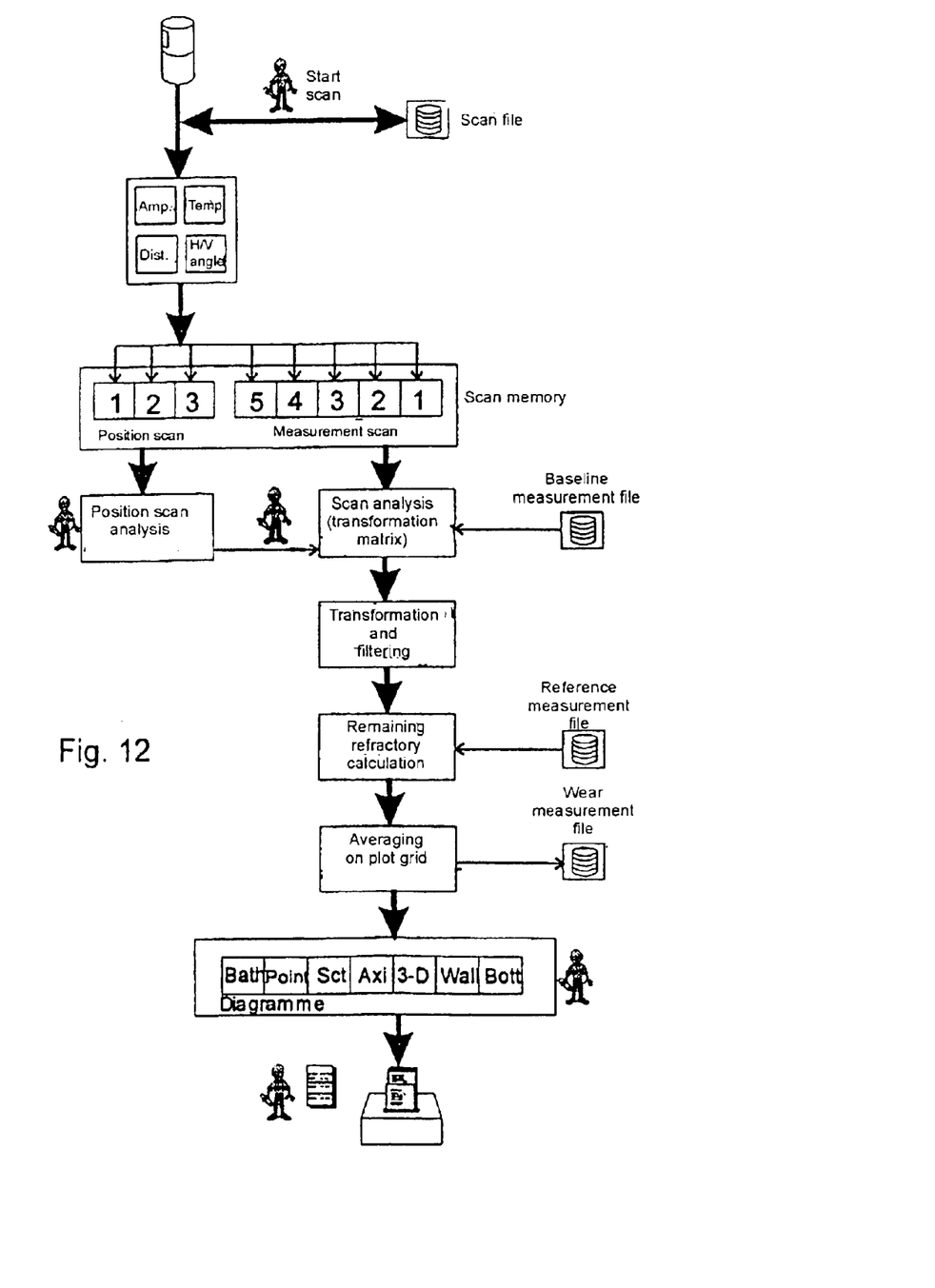
FIG. 12 a data flow diagram of a wear measurement of a converter carried out using the inventive method.

The coordinate of the mouth point to be found is then calculated by determining the position of best agreement according to (5) $S\_\text{opt} = \text{Min}(S(m))$ $\rightarrow m\_\text{opt} = m\ (S\_\text{opt})$ $\rightarrow \phi\_\text{opt} = \phi(m\_\text{opt})$ $\rightarrow \text{Rad}\_\text{opt} = \text{Rad}(m\_\text{opt})$ The execution of a wear measurement of the refractory lining of a metallurgical vessel, whose position relative to the measurement device 100 is determined using the inventive method, is described below with reference to FIGS. 11a), 11b) and 12.

To this end, a distinction may be drawn between three fundamental types of measurements or their analyses:

1) baseline measurement
2) reference measurement
3) wear measurement

1) The baseline measurement, which generally is carried out on a clean vessel, measures the spatial arrangement of the following structures on the vessel:

the position of a permanent clean structure relative to the rotational axis system (converter) or to the object system (ladle)

the position of the mouth ring relative to the rotational axis system (converter).

This information is stored in a vessel-specific baseline file. It is needed for determining the position of the vessel relative to the measurement device in accordance with the inventive method for performing the wear measurement.

2. The reference measurement is generally the measurement of the vessel lined only with outer lining or of the fully cleared vessel (steel casing) and is thus only possible at certain times (periodically after several weeks, months or years). The profile of the vessel with or without the outer lining can also be taken from a drawing (editing of the reference profile) instead of from the reference measurement. The reference profile is stored in a reference file.

If the measurement has been performed on the steel casing of the vessel and a file is present that contains a comparison profile (drawing) of the vessel, a deformation analysis is them carried out using a data processing device, and a measurement file regarding the current steel casing profile is generated. In contrast, when the outer lining is measured, the relevant measurement file is created and is analyzed with reference to the steel casing profile, or if measured values are not available for the latter, with reference to the comparison profile.

3. The wear measurement measures the vessel lined with the working lining and can be carried out at almost any time on the empty vessel. In this context, the shortest possible overall duration of measurement is of primary importance so as not to impede production. The wear profile is likewise stored in a file.

In most cases, the vessel mouth is dirty during this measurement so that it must be reconstructed with the aid of the baseline file before each measurement (scan analysis). Subsequently, the bath level can be calculated from the current profile data and a predefined steel quantity. To obtain the current refractory thickness of the working lining (remaining refractory thickness), the previously recorded reference profile of the outer lining is read out of the reference file and compared with the current measurement.

At each measurement (wear, reference or baseline), multiple scans are performed as a general rule, i.e. repeat scans, scans at different object tilt angles, or from different measurement positions.

The typical 450×450 measurement points of a scan can optimally be stored in a scan file. Here, each measurement point can contain the abovementioned five measurement values, namely distance Rad between the measurement device and the reflecting point of the object amplitude of the reflected LASER pulse LP' thermal radiation WS at the reflecting point of the object horizontal and vertical angles at which the LASER pulse LP is emitted by the measurement device.

Since the position of the vessel relative to the measurement device is not known in most cases, position scans in accordance with the inventive method are performed in which clean external structures are measured. The unknown measurement position of the measurement device relative to the vessel can then be determined therefrom. All these scans together and, if applicable, external measured values (for example, tilt angle of the converter when previously known by means of an inclinometer) constitute the raw measurement data.

The example of a converter measurement is used below to explain how the measurement is constructed from the individual scans.

After the measurement device 100 has been set up in the measurement position M (cf. FIG. 11a), the vessel G is moved to tilt position 0. The operator enters the current tilt angle—if this is known from an inclinometer—and records the position scan No. 1.

Using these raw data, the position of the measurement device is determined with respect to the vessel G (scan analysis) by means of the inventive method.

The individual scan analysis can also be performed after all scans have been recorded so as not to unnecessarily delay production.

The vessel G is next rotated to tilt position 1. The operator again enters the current tilt angle and records measurement scan No. 1. If scan analysis of the position scan has already been carried out, the program can now directly calculate the position of the mouth circle and superimpose it on the amplitude image. The operator now performs the two additional measurement scans No. 2 and No. 3 at tilt positions II and III in the same manner.

In order to measure the lateral upper edges of the vessel G at 90° object angle, which in this example should be hidden by the mouth, the operator moves the measurement device 100 into the measurement position L. To measure the precise location of the measurement device 100 in this position, he rotates the vessel G back to the tilt position 0 and records the position scan No. 2. Next he rotates the converter to tilt position II and records the measurement scan No. 4. The position scan to which this measurement belongs is recorded and displayed to the operator.

To measure the upper vessel edges at 270° object angle, the measurement device 100 is now placed in measurement position R, the vessel is rotated back to tilt position 0, and position scan No. 3 is recorded. Then the vessel is rotated to position II and measurement scan No. 5 is recorded.

The sequence described here can also be written in abbreviated form as follows:
1) position scan No. 1 M 0
2) measurement scan No. 1 M I
3) measurement scan No. 2 M II
4) measurement scan No. 3 M III
5) position scan No. 2 L 0
6) measurement scan No. 4 L II
7) position scan No. 3 R 0
8) measurement scan No. 5 R II The following rules apply here:

The data processing device numbers the position scans and measurement scans in such a way that the numbers are always filled in from bottom to top. A measurement scan is associated with the last position scan performed. The first scan performed must always be a position scan.

Now all 8 scan memories are filled with scan data and the raw data base is thus established. Production in the plant can be resumed.

If scan analysis was not performed immediately after each scan, it can be performed at a later time. The transformation matrices of all 5 measurement scans are calculated as the result.

The actual analysis is carried out next. At this time, the data processing device first transforms the measurement points from the device system into the object system and during the process sorts out the measurement points that do not belong to the interior of the vessel. It next calculates the remaining refractory thickness by comparison with the reference file. In order to calculate the data of the measurement file, and thus the diagrams of the analysis, the program averages the measurement points in a special manner. The measurement file is stored under a sequential number and the diagrams are generated and printed out. The operator can now manually print out the calculation of certain longitudinal sections through the vessel, for example because a particularly thin working lining was measured at this location. This concludes both the analysis and the measurement.

Position determination of the vessel relative to the measurement device and the subsequent measurement of the vessel have been described above using the example of a converter. Since the inventive method is suitable for position determination of any desired object, it is a matter of course that the position determination and subsequent measurement of other metallurgical vessels can also be carried out with this method.

If the vessel is a ladle, it is customarily measured lying on its side.

To this end, the wall-bottom operator is used as the known structure to determine the coordinate system of the ladle. With this operator, the position of the inner edge of the bottom without refractory material is measured first. Then the positions of additional known structures of the ladle, which also are reliably reproducible, are determined and brought in relation to a lateral ring surrounding and approximately parallel to the opening of the ladle shell. The measured location of the structures is determined in the object coordinate system and stored; later, for the purpose of position determination, it is compared to the values measured at that time.

A major advantage of the inventive method is that the determination of the vessel position relative to the measurement device takes place in a short time and—as already described —the analysis of individual scans can take place after all scans have been recorded, which reduces the measurement time still further.

Hence the inventive method makes it possible for the first time to measure the interior even of hot metallurgical vessels which do not tilt sufficiently with the result that the measurement device must be placed in the hot zone above these vessels for the duration of the measurement.

A very short measuring time is made necessary by both the extreme temperature loading that results from the above situation and also by the time limits imposed by production.

An important application example is electric arc furnaces where the measurement device can be placed approximately over the center of the furnace opening after the cover has been removed. The edge of the opening can then advantageously serve as the known structure for determining the furnace/measurement device position. The measurement is then performed using the mouth operator.

LIST OF REFERENCE CHARACTERS 1 bottom
2 wall
3 mouth
4 interior wall
d outer diameter of the mouth ring
b thickness of the mouth ring
A point within the vessel
B intersection point of the bottom and interior wall
C point on inner mouth boundary
D point approximately in the center between inner and outer mouth boundaries
E point on outer mouth boundary
P scan point
M center point of sphere
100 measurement device
10 transmitter
11 receiver
12 polygonal mirror
LP laser pulse
O object
X axis
Y axis

What is claimed is:

1. A Method for the identification and determination of the position of an object, in particular a metallurgical vessel, in particular to measure its refractory lining, by means of electromagnetic radiation comprising:

defining an operator with respect to a two-dimensional or three-dimensional structure of known shape and size;

determining distance values (Rad(m,n)) and associated measuring angles ($\phi$(m), $\Theta$(n)) in the region of the structure;

scaling the operator using measured distance value (Rad(m,n)) and the associated measuring angles ($\phi$(m), $\Theta$(n)) in a pixel coordinate system, wherein the operators extent (imax, jmax) and resolution ($\Delta$i, $\Delta$j) in the pixel coordinate system (i:[−imax,imax, $\Delta$i], j:[−jmax, jmax, $\Delta$j]) and the expected values of the operator (R(m+i,n+j)) are converted to measured polar coordinates (Rad(m,n), $\phi$(m), $\Theta$(n));

calculating a result value (S(m,n)) from the differences between the expected values of the operator (R(m+i, n+j)) and the measured values (R(m+i,n+j)); and determining the location of the structure to be found from the position of the minimum result value.

2. The method according to claim 1, further comprising:

defining the operator in two-dimensional or three-dimensional Cartesian space using the known shape and size of the structure;

performing pixel by pixel scanning of the matrix (Rad(m,n)) to determine pixel borders;

scaling the operator using current scanned coordinates, where the pixel borders are calculated in a rasterized polar coordinate image, and expected distances (R(m+i,n+j)) are calculated for all pixels of the operator in the previously calculated pixel borders;

calculating the operator result at the scanned point (m,n) using a quadratic deviation between expected distance and measured distance to $$S(m, n) = \sum_{i,j} \{R(m + i, n + j) - \text{Rad}(m + i, n + j)\}^2 / \text{norm}(m, n)$$

selecting the desired coordinates Rad(m_opt,n_opt) or Rad($\phi$_opt, $\Theta$_opt) with the best operator result value by calculating the minimum.

3. The method according to claim 1 wherein intensity values (Amp(m,n)) of backscattered electromagnetic radiation are measured in addition to the distance values (Rad(m,n)) producing an amplitude image.

4. The method according to claim 1 wherein a sphere is the structure.

5. The method according to claim 3, further comprising using a light-colored laminar mark that is recessed relative to its surroundings as the structure, and scaling the operator using measured distance values (Rad(m,n)) to determine the expected size of the mark in the amplitude image.

6. The method according to claim 1, wherein the vessel itself serves as the structure, and the operator finds a point on the vessel mouth, and at least two additional points distributed about it on the mouth of the vessel, wherein at least one additional point in the vessel interior is found as a control.

7. The method according to claim 6, wherein the distance and angle values of points on the vessel mouth are measured in search windows which run radial to an identified vessel center and extracting a vector (Rad(K)) on which a search is made for a segment with a predetermined length (b) that approximately corresponds to the thickness of the mouth ring by means of a scaled operator.

8. The method according to claim 1, wherein an angle of inclination $\gamma$ of the vessel is additionally measured, preferably by means of an inclinometer that can be pivoted about an axis running perpendicular to the longitudinal axis of the vessel, and is taken into account in determining the position of the vessel.

9. The method according to claim 1, wherein a transition region between the wall and bottom of the vessel serves as the structure, and the operator is defined by two segments of length ($\Delta x$, $\Delta z$), which have a predetermined angle ($\delta$) to one another and whose ends coincide at one point.

10. The method according to claim 1, wherein the position of a converter is determined.

11. The method according to claim 1, wherein the position of a ladle is determined.

12. The method according to claim 1 wherein the position of an electric arc furnace is determined.

13. A device for carrying out the method according to claim 1 comprising:
   a transmitting device to emit pulsed electromagnetic radiation;
   a receiving device to receive the pulsed electromagnetic radiation reflected by an object;
   a time measurement device to measure the transit time of a pulse of electromagnetic radiation between emission and reception after reflection from the object;
   a deflector device for predetermined, periodic deflection of the pulsed electromagnetic radiation in two mutually perpendicular directions;
   a data acquisition and processing device for acquiring the angles in two mutually perpendicular directions at which the electromagnetic radiation has been emitted, and the transit time, and also for storing previously known or determined spatial structures and for comparing spatial structures measured through acquisition of the angles and the transit time with the previously known or determined structures in order to determine the present position of the measured structures.

14. A device according to claim 13, wherein the receiving device further comprises a means for acquiring the amplitude of the electromagnetic radiation reflected by the object.

15. A device according to claim 13, wherein the receiving device further comprises a means for acquiring thermal radiation that is emitted approximately at the location reflecting the electromagnetic radiation.

16. A device according to claim 13, characterized in that the transmitting device is a LASER diode that can be operated in pulsed mode.

17. A device according to claim 16, wherein the receiving device is a photodiode adjusted to the frequency of the radiation emitted by the LASER diode.

18. A device according to claim 13, wherein the deflector device comprises a polygonal mirror (12) that rotates about an axis (X) perpendicular to its parallel faces, and whose faces that intersect at acute angles reflect the electromagnetic radiation.

19. A device according to claims 13, wherein the deflector further comprises a means for reciprocating motion of the measurement device (100) about an axis (Y) that is approximately perpendicular to the axis of rotation (X) of the polygonal mirror (12).

20. A device according to claims 13, wherein the measurement device is mounted on a bracket in such a way that it can be moved back and forth between a position that is removed from the metallurgical vessel—for example an electric arc furnace—and a position above the open metallurgical vessel or within the open metallurgical vessel.

21. A device according to claim 20, wherein a device for the application of refractory material to the interior of the metallurgical vessel is provided on the bracket in a fixed spatial relationship to the measurement device.

22. A device according to claim 21, characterized in that the device for the application of refractory material is a spray robot for applying monolithic refractory material to the interior of a metallurgical vessel.

* * * * *

UNITED STATES PATENT AND TRADEMARK OFFICE
CERTIFICATE OF CORRECTION

PATENT NO. : 6,922,251 B1
DATED : July 26, 2005
INVENTOR(S) : Kirchhoff et al.

It is certified that error appears in the above-identified patent and that said Letters Patent is hereby corrected as shown below:

<u>Column 14,</u>
Line 11, delete "(R(m+i,n+j))" and insert -- (Rad(m+i,n+j)) --.

Signed and Sealed this

Fourth Day of April, 2006

JON W. DUDAS
*Director of the United States Patent and Trademark Office*